United States Patent
Kobayashi

Patent Number: 6,009,371
Date of Patent: Dec. 28, 1999

[54] CONTROL APPARATUS AND METHOD FOR AN INTERNAL COMBUSTION ENGINE INSTALLED IN A VEHICLE

[75] Inventor: Yukio Kobayashi, Kasugai, Japan

[73] Assignee: Toyota Jidosha Kabushiki Kaisha, Toyota, Japan

[21] Appl. No.: 09/166,195

[22] Filed: Oct. 5, 1998

[30] Foreign Application Priority Data

Oct. 8, 1997 [JP] Japan ................................. 9-275882

[51] Int. Cl.⁶ ................................................ F02D 41/16
[52] U.S. Cl. .................................. 701/112; 123/339.19
[58] Field of Search .......................... 123/339.19, 674, 123/675; 701/102, 112, 106

[56] References Cited

U.S. PATENT DOCUMENTS

| | | | |
|---|---|---|---|
| 4,520,271 | 5/1985 | Goertler et al. | |
| 5,687,082 | 11/1997 | Rizzoni | 701/106 |
| 5,828,967 | 10/1998 | Ueda | 701/112 |

FOREIGN PATENT DOCUMENTS

| | | |
|---|---|---|
| A-58-158343 | 9/1983 | Japan. |
| A-6-48190 | 2/1994 | Japan. |
| A-7-63083 | 3/1995 | Japan. |

*Primary Examiner*—John Kwon
*Attorney, Agent, or Firm*—Oliff & Berridge, PLC

[57] ABSTRACT

Vehicle-installed internal combustion engine control apparatus and method maintain a good operating condition of the internal combustion engine even if the opportunity of control learning is limited. To adjust the closed-state opening of a throttle valve, that is, opening of the throttle valve under a non-load condition, feedback control of the opening of the throttle valve is performed so that the idle speed approaches a target revolution speed, while the non-load idling of the engine is being performed. A feedback correction amount for the feedback control is stored as a learned value. The learned correction value is reflected in the next and later operations of the closed-state opening control of the throttle valve, so that a proper closed-state opening of the throttle valve is set. During the learning of the feedback correction amount, the engine is inhibited from being stopped.

16 Claims, 7 Drawing Sheets

11. VEHICLE
12. ENGINE
24. REVOLUTION SPEED SENSOR
25. WATER TEMPERATURE SENSOR
35. ACCELERATOR PEDAL SENSOR
38. IGNITION SWITCH

CONTROL APPARATUS AND METHOD FOR AN INTERNAL COMBUSTION ENGINE INSTALLED IN A VEHICLE

BACKGROUND OF THE INVENTION

1. Field of Invention

The present invention relates to an internal combustion engine control apparatus and, more particularly, to an apparatus and a method for controlling an internal combustion engine installed in a hybrid-type vehicle that runs by selectively using two types of motors, that is, an internal combustion engine and, for example, an electric motor.

2. Description of Related Art

For environmental protection, there is a demand for a maximum-possible reduction of emissions from an internal combustion engine installed in a motor vehicle. To meet such a requirement, one type of motor vehicle that stops its internal combustion engine in accordance with the running condition of the vehicle has been proposed. As an example of this type of motor vehicle, a hybrid motor vehicle is disclosed in Japanese Patent Application Laid-Open No. HEI 6-48190. This hybrid motor vehicle is equipped with two types of driving motors, that is, an internal combustion engine and an electric motor, and switches between them in accordance with the running condition of the vehicle. More specifically, during high-speed running, the internal combustion engine is operated in order to output high power which is required. When the running speed of the vehicle is low and the depression of the accelerator pedal is small, the electric motor is used to drive the vehicle since high power is not required in such a running condition The internal combustion engine is stopped while the electric motor is used to drive the vehicle, thereby significantly reducing emissions from the internal combustion engine in comparison with ordinary internal combustion engine-driven vehicles.

In a typical internal combustion engine, operation control is performed in various manners so as to maintain a good operating condition of the engine. In order to achieve an operating condition of the internal combustion engine as good as the present condition compared to when the next operation control is started, a control value is used for the present operation control and is stored as a learned value. That is, a control value for the operation control of the internal combustion engine is learned, and the learned control value is used the next time the operation control is started, so as to achieve as good an operating condition of the internal combustion engine at the start of the next operation control.

In the hybrid motor vehicle as described above, however, since the internal combustion engine is not always in operation, the opportunity of learning the control value for the operation control of the engine is correspondingly reduced. Reduction in the opportunity of learning the control value may lead to degradation of the appropriateness of the control value stored as a learned value. If this happens, the operation control based on the learned control value will fail to achieve as good an operating condition of the internal combustion engine.

While the hybrid motor vehicle is stopped, the idling of the internal combustion engine is performed only when there is a load, for example, a load for charging the battery, and the idling operation is not performed when there is no load. Therefore, unlike ordinary motor vehicles, the hybrid motor vehicle does not perform idle speed control in which during non-load idling, a throttle valve opening (flow of intake air) is adjusted so that the actual idle speed approaches a target revolution speed. Therefore, in the hybrid motor vehicle, the throttle valve is not controlled at an opening under the non-load condition, and the throttle valve opening under the non-load condition (defined as "closed state") is not maintained.

Since the hybrid motor vehicle is unable to perform learning control of the throttle valve opening when the throttle valve is in the closed state, the closed-state opening of the throttle valve, that is, the opening of the throttle valve in the closed state defined above, must be set to a fixed value. Therefore, in the hybrid motor vehicle, the closed-state opening of the throttle valve may be excessively closed or excessively opened relative to the proper opening of the throttle valve as the proper opening varies in accordance with the operating condition of the internal combustion engine. If, for example, the internal combustion engine is idling to charge the battery when the closed-state opening of the throttle valve is significantly smaller than the proper opening, the revolution speed of the engine may become lower than a proper value so that the battery cannot be sufficiently charged. If the closed-state opening of the throttle valve is significantly greater than the proper opening, the revolution speed of the internal combustion engine may become higher than the proper value, thereby leading to deterioration of the drivability.

SUMMARY OF THE INVENTION

Accordingly, it is an object of the present invention to provide a control apparatus for an internal combustion engine installed in a vehicle capable of achieving a good operating condition of the internal combustion engine through a control based on a learned control value even if the internal combustion engine provides a reduced opportunity to learn such a control value.

According to the invention, there is provided a control apparatus for an internal combustion engine installed in a vehicle including an engine stop device for stopping an internal combustion engine installed in the vehicle, in accordance with a running condition of the vehicle, a control value learning device for learning a control value for control of the internal combustion engine during operation of the engine, and a stop inhibiting device for inhibiting the internal combustion engine from being stopped by the engine stop device until the learning of the control value by the control value learning device is completed.

In the control apparatus, if the internal combustion engine is to be stopped in accordance with the running condition of the vehicle, the internal combustion engine is not stopped until the learning of the control value for controlling the internal combustion engine is completed. Therefore, when the internal combustion engine is controlled on the basis of the learned control value during the next operation of the internal combustion engine, a good operating condition of the engine can be achieved.

The control apparatus of the invention may further include a learned value correction device for correcting the control value learned by the control value learning device, in accordance with the running condition of the internal combustion engine.

By correcting the learned control value in accordance with the running condition of the internal combustion engine, the learned value correction device provides a control value corresponding to a proper control value obtained through the learning operation that is normally performed. Therefore, even if the opportunity for learning the control value is reduced, for example, due to frequent stops of the internal combustion engine, a good operating condition of the engine can be achieved through the control of the engine based on the corrected control value.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to FIGS. 1 through 8.

Figure 1:
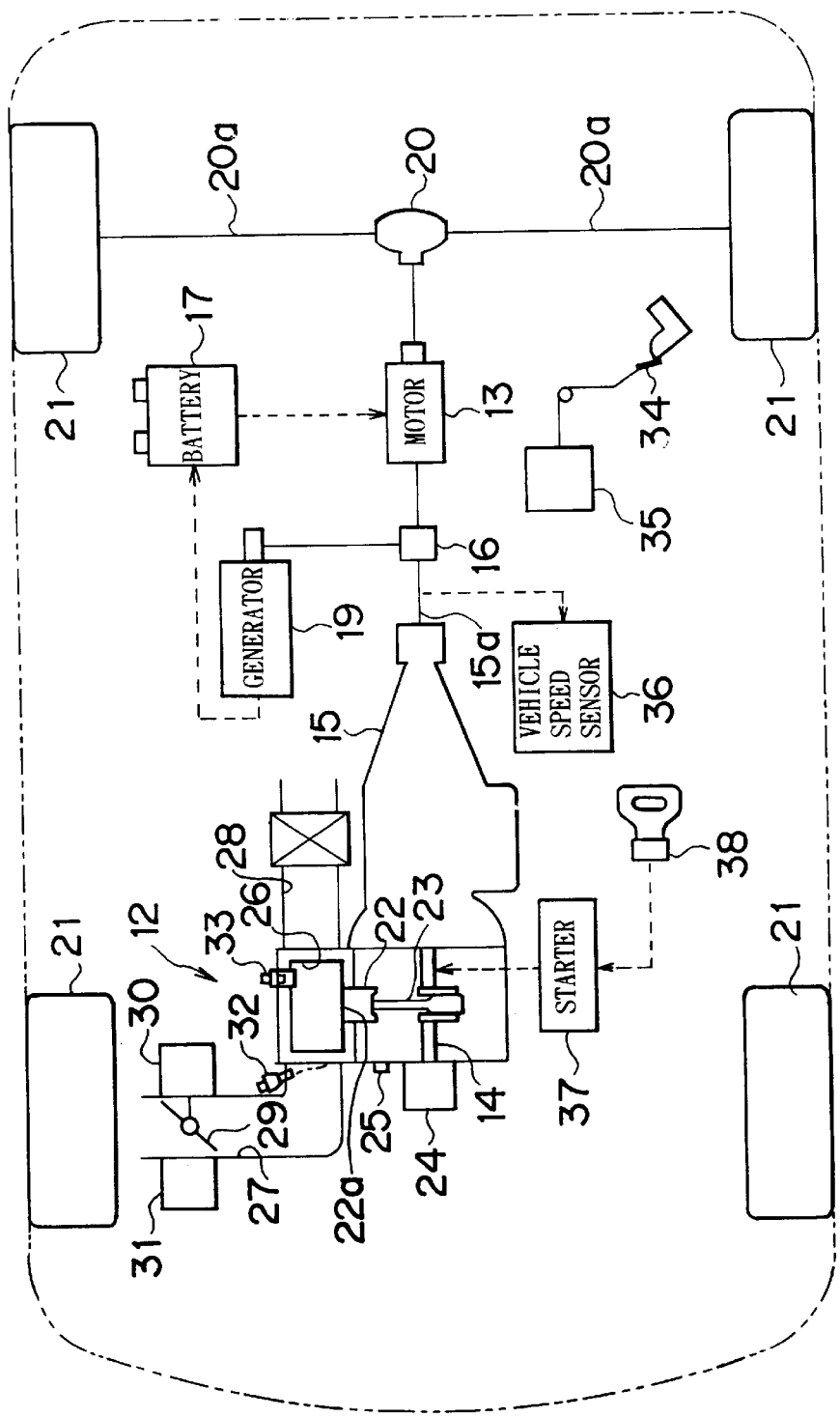
FIG. 1 is a schematic illustration of a motor vehicle to which the invention is applied.

Referring to FIG. 1, a motor vehicle 11 is a generally-termed hybrid motor vehicle which is equipped with two types of driving motors, that is, an internal combustion engine 12 and an electric motor 13, and which is driven by at least one of the engine 12 and the electric motor 13. A crankshaft 14, that is, an output shaft of the engine 12 installed in the motor vehicle 11, is connected to a planetary gear unit 16, via an automatic transmission 15. The planetary gear unit 16 is also connected to the electric motor 13 driven by electric power supplied from a battery 17, and to a generator 19 that charges the battery 17.

During operation of the engine 12, the planetary gear unit 16 transmits rotation from the crankshaft 14 to the electric motor 13 and the generator 19 or prevents the transmission of rotation thereto. The electric motor 13 is also connected to wheels 21 of the motor vehicle 11, via a differential gear unit 20 and axle shafts 20a. Therefore, the wheels 21 are driven at least by either the engine 12 or the electric motor 13, whereby the motor vehicle 11 is driven.

Although in this embodiment, the invention is applied to the hybrid-type motor vehicle 11, it is also possible to apply the invention to other types of motor vehicles that stops the internal combustion engine during operation of the vehicle.

The construction of the engine 12 will now be described in detail.

The crankshaft 14 of the engine 12 is connected to a reciprocally movable piston 22 by a connecting rod 23. The reciprocal movement of the piston 22 is converted into rotation of the crankshaft 14 by the connecting rod 23. A revolution speed sensor 24 for detecting the revolution speed of the engine 12 is provided at a side of the crankshaft 14. The engine 12 is further provided with a water temperature sensor 25 for detecting the temperature of cooling water of the engine 12, and a combustion chamber 26 that is partially defined by a head portion 22a of the piston 22. The combustion chamber 26 is connected in communication with an intake passage 27 and an exhaust passage 28.

A throttle valve 29 that is opened and closed by an actuator 30 is provided in the intake passage 27. The actuator 30 is formed by a rotary electromagnetic solenoid. The throttle valve 29 is turned or rotated to adjust its opening by the duty control of the voltage applied to the solenoid. By adjustment of the opening of the throttle valve 29, the air flow area of the intake passage 27 is changed, and the flow of air taken into the combustion chamber 26 is adjusted. The opening of the throttle valve 29 (throttle opening) is detected by a throttle sensor 31.

The engine 12 is provided with a fuel injection valve 32 for injecting fuel and a spark plug 33 for igniting mixture gas in the combustion chamber 26. When high-pressure fuel is injected from the fuel injection valve 32 into the intake passage 27, fuel mixes with air to form a gas mixture. The gas mixture introduced into the combustion chamber 26 is ignited by the spark plug 33 to undergo combustion. The energy produced by the combustion reciprocates the piston 22. After combustion, exhaust gas is discharged into the exhaust passage 28.

The motor vehicle 11 has an accelerator pedal 34 for adjusting the opening of the throttle valve 29, and an accelerator pedal sensor 35 for detecting the amount of depression of the accelerator pedal 34 when it is operated by a driver, and a vehicle speed sensor 36 for detecting the speed of the motor vehicle 11. Furthermore, the motor vehicle 11 has a starter 37 that starts the engine 12 by forcing the crankshaft 14 of the engine 12 to rotate from a stopped state. The starter 37 is driven upon operation of an ignition switch 38 provided in a passenger compartment of the motor vehicle 11.

The connecting construction between the engine 12 and the electric motor 13 and the generator 19 will be described in detail with reference to FIG. 2, by mainly focusing on the planetary gear unit 16.

Figure 2:
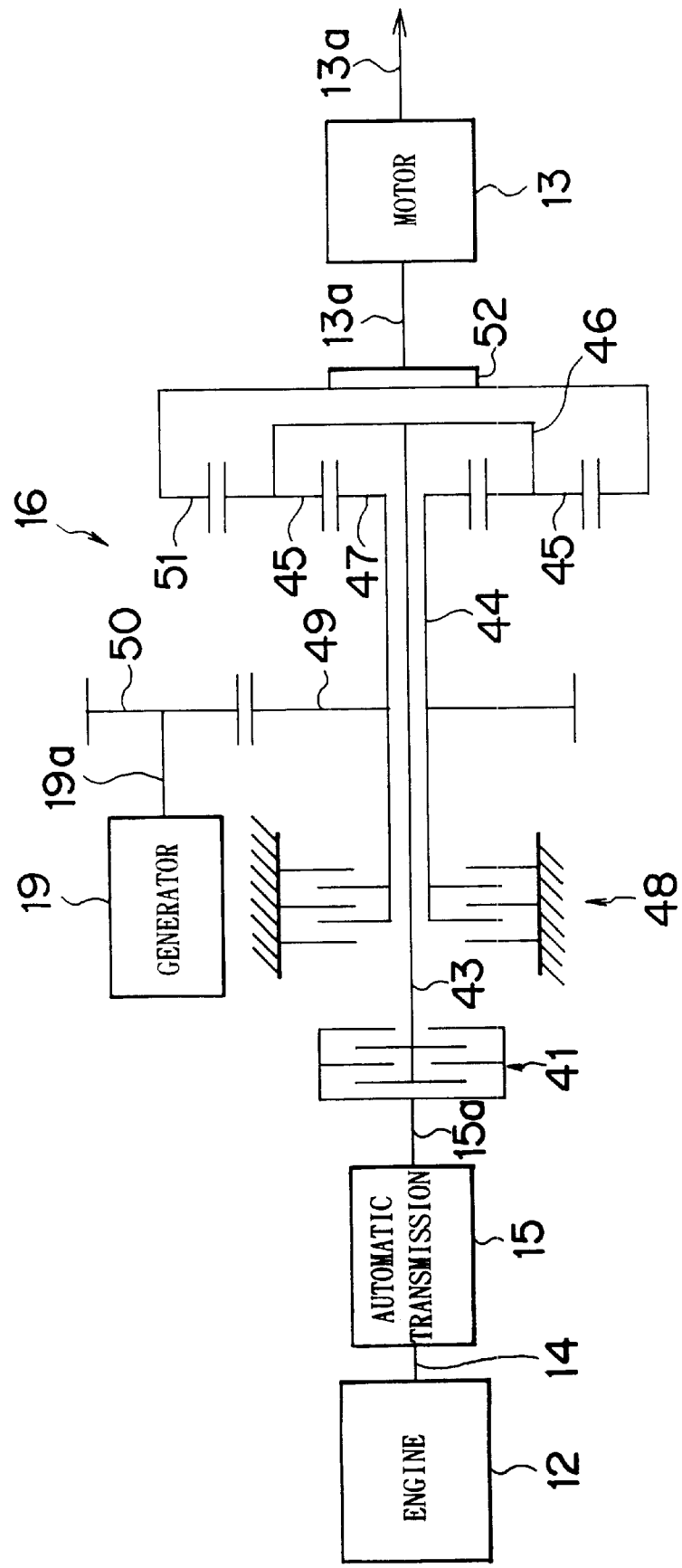
FIG. 2 is a schematic illustration of the construction of a planetary gear unit.

As indicated in FIG. 2, the planetary gear unit 16 includes a first clutch 41, an intermediate shaft 43, a hollow shaft 44, a plurality of planet gears 45, a carrier 46, a sun gear 47, a second clutch 48, a ring gear 51 and a brake 52. The crankshaft 14 of the engine 12 is connected to the intermediate shaft 43, via the automatic transmission 15, its output shaft 15a, and the first clutch 41. The automatic transmission output shaft 15a and the intermediate shaft 43 are disconnected from each other by disengaging the first clutch 41, and they become connected by engaging the first clutch 41.

The intermediate shaft 43 extends through the hollow shaft 44 having a tubular shape, in the direction of the axis of the hollow shaft 44. The intermediate shaft 43 is connected to the carrier 46 in such a manner that they are rotatable together as a unit. The carrier 46 rotatably supports the planet gears 45. The hollow shaft 44 is rotatable separately from the intermediate shaft 43. An end of the hollow shaft 44, that is, the end on the side of the carrier 46, is fixed to the sun gear 47, which is meshed with the planet gears 45. The second clutch 48 is disposed at end of the hollow shaft 44 closer to the first clutch 41. The second clutch 48 switches the hollow shaft 44 between a rotatable state and a fixed state. The hollow shaft 44 is set into the fixed state by engaging the second clutch 48. A first gear 49 is fixed to a lengthwise intermediate portion of the hollow shaft 44. The first gear 49 is meshed with a second gear 50 that is fixed to an input shaft 19a of the generator 19.

The ring gear 51 meshed with the planet gears 45 is disposed so as to surround or embrace the planet gears 45. The ring gear 51 is connected to an output shaft 13a of the electric motor 13. Disposed near the ring gear 51 is the brake 52 for switching the ring gear 51 between a rotatable state and a fixed state. The ring gear 51 becomes rotatable when the brake 52 is set to a non-operation state, and it becomes fixed when the brake 52 is set to an operation state.

In the planetary gear unit 16 constructed as described above, the output shaft 15a of the automatic transmission 15 and the intermediate shaft 43 are disconnected from each other by disengaging the first clutch 41, so that rotation from the crankshaft 14 is not transmitted to either the electric motor 13 or the generator 19.

If the first and second clutches 41, 48 are engaged and the brake 52 is set to the non-operation state, the output shaft 15a of the automatic transmission 15 and the intermediate shaft 43 are interconnected, so that rotation from the crankshaft 14 is entirely transmitted to the electric motor 13.

If the first clutch 41 is engaged and the second clutch 48 is disengaged and the brake 52 is set to the non-operation state, both the hollow shaft 44 and the ring gear 51 become rotatable, so that rotation from the crankshaft 14 is transmitted to both the electric motor 13 and the generator 19. When rotation is transmitted from the crankshaft 14 to the generator 19, the generator 19 charges the battery 17 (see FIG. 1).

If the brake 52 is set to the operation state while the first clutch 41 is engaged and the second clutch 48 is disengaged, the hollow shaft 44 becomes rotatable and the ring gear 51 becomes fixed. Therefore, rotation from the crankshaft 14 is transmitted only to the generator 19. Since rotation from the crankshaft 14 is entirely transmitted to the generator 19, the battery 17 is efficiently charged by the generator 19.

Figure 3:
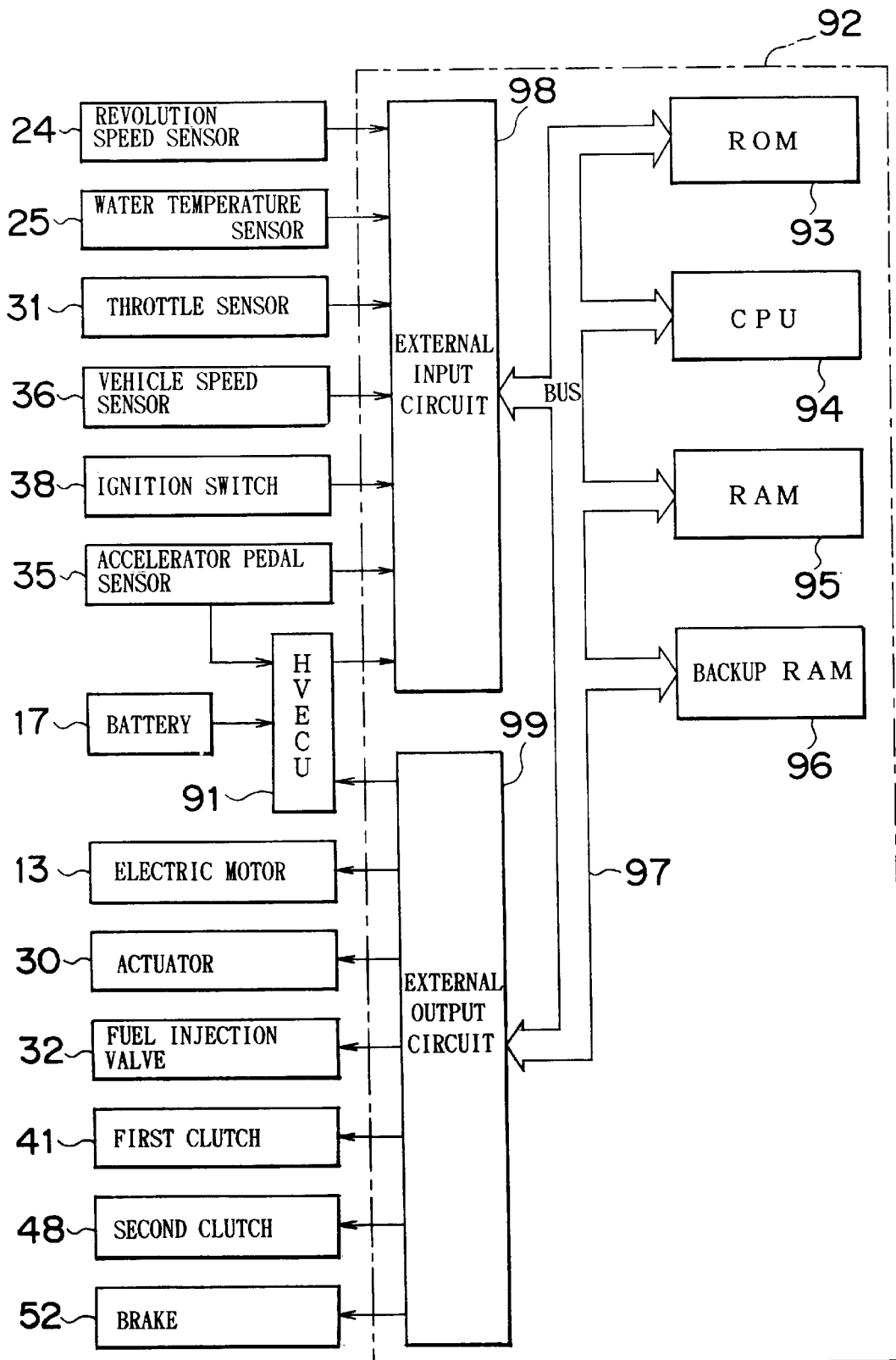
FIG. 3 is a block diagram of the electrical arrangement of a control apparatus according to an embodiment of the invention.

An electrical arrangement of a control apparatus according to the embodiment will be described with reference to FIG. 3.

The control apparatus has an electronic control unit (hereinafter, referred to as "ECU") 92 for controlling the operating condition of the engine 12 and the electric motor 13. The ECU 92 is formed as a logic circuit having a ROM 93, a CPU 94, a RAM 95 and a backup RAM 96.

The ROM 93 is a memory that stores various control programs and maps to be referred to during execution of the various control programs. The CPU 94 executes operations based on the various programs and the maps stored in the ROM 93. The RAM 95 is a memory for temporarily storing results of operations executed by the CPU 94 and data inputted from the various sensors. The backup RAM 96 is a non-volatile memory for storing data that needs to be retained even when the engine 12 is stopped. The ROM 93, the CPU 94, the RAM 95 and the backup RAM 96 are interconnected by a bus 97, and they are also connected to an external input circuit 98 and an external output circuit 99.

The external input circuit 98 is connected to the revolution speed sensor 24, the water temperature sensor 25, the throttle sensor 31, the accelerator pedal sensor 35, the vehicle speed sensor 36 and the ignition switch 38. The external input circuit 98 is also connected to a hybrid-vehicle electronic control unit (hereinafter, referred to as "HVECU") 91 for adjusting the amount of power generated by the generator 19, in accordance with the running condition of the motor vehicle. The external output circuit 99 is connected to the electric motor 13, the actuator 30, the fuel injection valve 32, the first clutch 41, the second clutch 48, the brake 52 and the HVECU 91.

Figure 4:
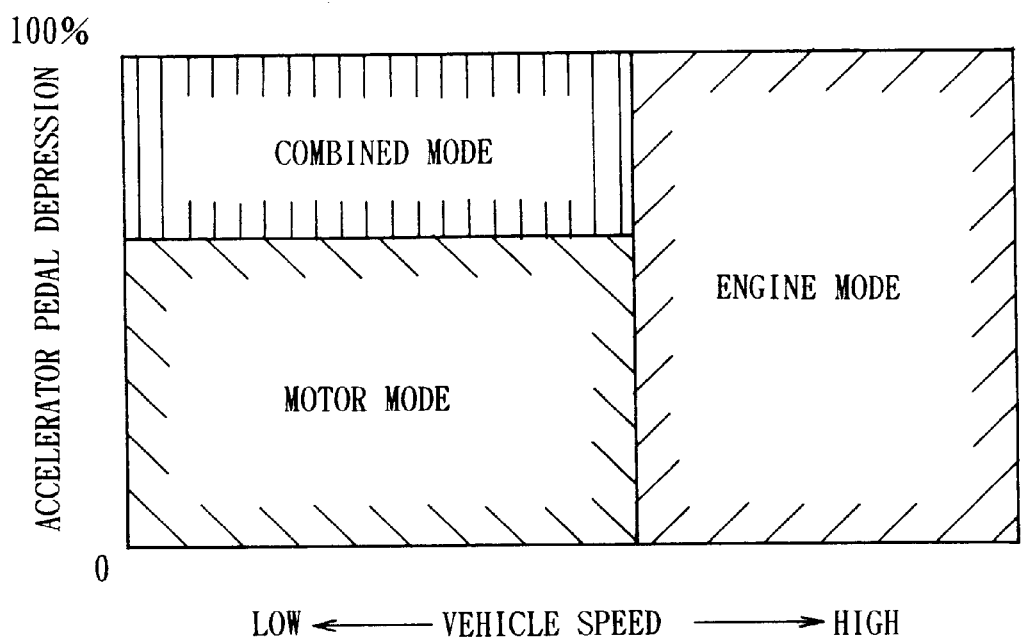
FIG. 4 is a map for determining a running mode of the vehicle.

Constructed as described above, the ECU 92 determines the amount of depression of the accelerator pedal 34 and the vehicle speed based on detection signals from the accelerator pedal sensor 35 and the vehicle speed sensor 36, and determines or selects a running mode of the motor vehicle 11 on the basis of the amount of accelerator pedal depression and the vehicle speed, with reference to a map indicated in FIG. 4. In this embodiment, three kinds of running modes of the motor vehicle 11 are provided, that is, an engine mode where the motor vehicle 11 is driven by the engine 12, a motor mode where the motor vehicle 11 is driven by the electric motor 13, and a combined mode where the motor vehicle 11 is driven by using both the engine 12 and the electric motor 13.

As is apparent from the map of FIG. 4, the engine mode is selected when the motor vehicle 11 is running at high speeds. During the engine mode, the ECU 92 engages the first and second clutches 41, 48, and sets the brake 52 and the electric motor 13 into the non-operation state, and drives the engine 12. Thus, the motor vehicle 11 is driven only by the engine 12 during the engine mode. The engine mode is selected as a running mode at the time of high-speed running, because high-speed running requires high power due to increased running resistance and because, in the operating condition of the engine 12 for high-speed running, emission degradation is relatively unlikely.

If the running speed of the motor vehicle 11 is low and the amount of accelerator pedal depression is large, the combined mode is entered. During the combined mode, the ECU 92 drives the engine 12 to drive the motor vehicle 11 as in the engine mode, and also operates the electric motor 13. That is, the motor vehicle 11 is driven by both the engine 12 and the electric motor 13. During the combined mode, the motor vehicle 11 is driven mainly by the electric motor 13, while assisted by the engine 12. The combined mode is selected as a running mode, for example, in a case where the driver has depressed the accelerator pedal 34 to climb a hill at a low vehicle speed. Such a hill climb requires a high power even if the vehicle speed is low. The combined mode provides sufficiently high power by operating both the engine 12 and the electric motor 13 to drive the motor vehicle 11 as described above.

If the running speed of the motor vehicle 11 is low and the amount of accelerator pedal depression is small, the motor mode is entered. During the motor mode, the ECU 92 disengages the first clutch 41 and engages the second clutch 48, and sets the brake 52 to the non-operation state, and operates the electric motor 13, thereby driving the motor vehicle 11 only by the electric motor 13. When the motor vehicle 11 is running at a low speed with a small amount of accelerator pedal depression, high power is not required, so that the running mode can be set so as to stop the engine 12, thereby stopping emissions from the engine 12.

When the running mode is switched to the engine mode or the combined mode, the ECU 92 performs the duty control of the voltage applied to the electromagnetic solenoid of the actuator 30 on the basis of a predetermined control map in such a manner that the opening of the throttle valve 29 increases as the detected amount of accelerator pedal depression increases. Furthermore, the ECU 92 determines an amount of intake air supplied into the combustion chamber 26 on the basis of the detection signal from the throttle sensor 31, and controls the fuel injection valve 32 on the basis of a predetermined control map in such a manner that the amount of fuel injected increases as the amount of intake air determined as described above increases. By controlling the fuel injection valve 32 in this manner, the air-fuel ratio of the gas mixture charged into the combustion chamber 26 is controlled.

The HVECU 91 determines an amount of accelerator pedal depression on the basis of the detection signal from the accelerator pedal sensor 35, and determines a battery charge amount on the basis of the signal from the battery 17, and calculates a required amount of power generation in accordance with the amount of accelerator pedal depression and the battery charge amount. The required amount of power generation is calculated as a large value if the amount of accelerator pedal depression is large or the battery charge amount is small. If the amount of accelerator pedal depression is small or the battery charged amount is large, the required amount of power generation is calculated as a small value.

The HVECU 91 outputs to the ECU 92 a signal corresponding to the required amount of power generation calculated as described above. Based on the signal (required amount of power generation) from the HVECU 91, the ECU 92 executes the operation control of the first and second clutches 41, 48 and the brake 52, and the engine revolution speed control, so as to cause the generator 19 to generate power in accordance with the required amount of power generation. If power generation is performed in accordance with the required amount of power generation in this manner, the driving force by the electric motor 13 becomes a value corresponding to the amount of accelerator pedal depression, and a sufficient battery charge amount is maintained.

In this embodiment, the non-load idling of the engine 12 is performed regardless of whether it is actually needed. During the non-load idling, the aforementioned idle speed control is performed to adjust the closed-state opening of the throttle valve 29. Furthermore, the thus-adjusted closed-state opening of the throttle valve 29 is reflected in the next performance of the non-load idling through the learning control. Therefore, the closed-state opening of the throttle valve 29 can be suitably adjusted during the next non-load idling, and the learned closed-state opening is reflected as a reference value to be used for the non-load idling.

Figure 7:
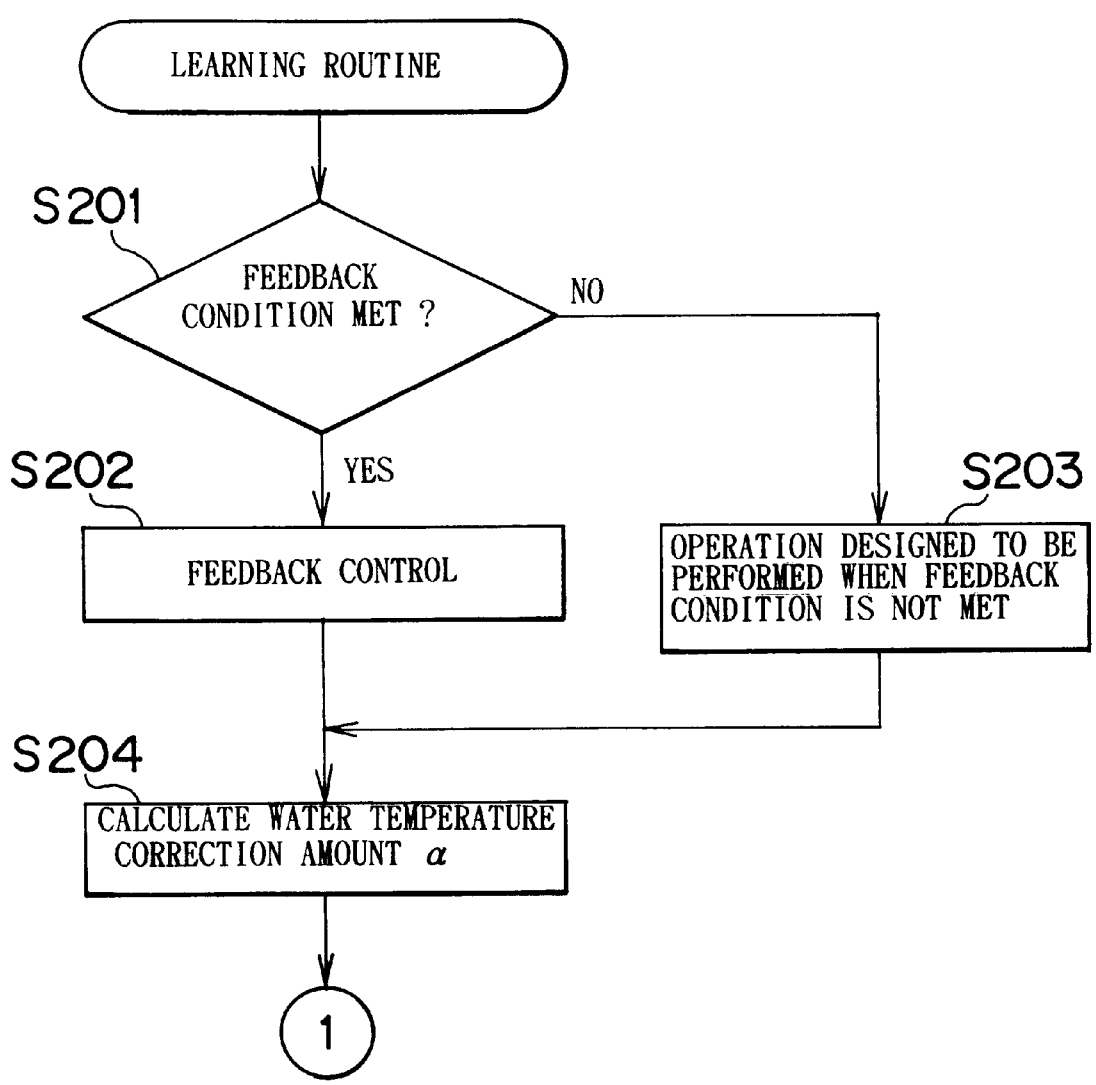
FIGS. 7 and 8 are flowcharts of learning procedures according to the invention.
Figure 8:
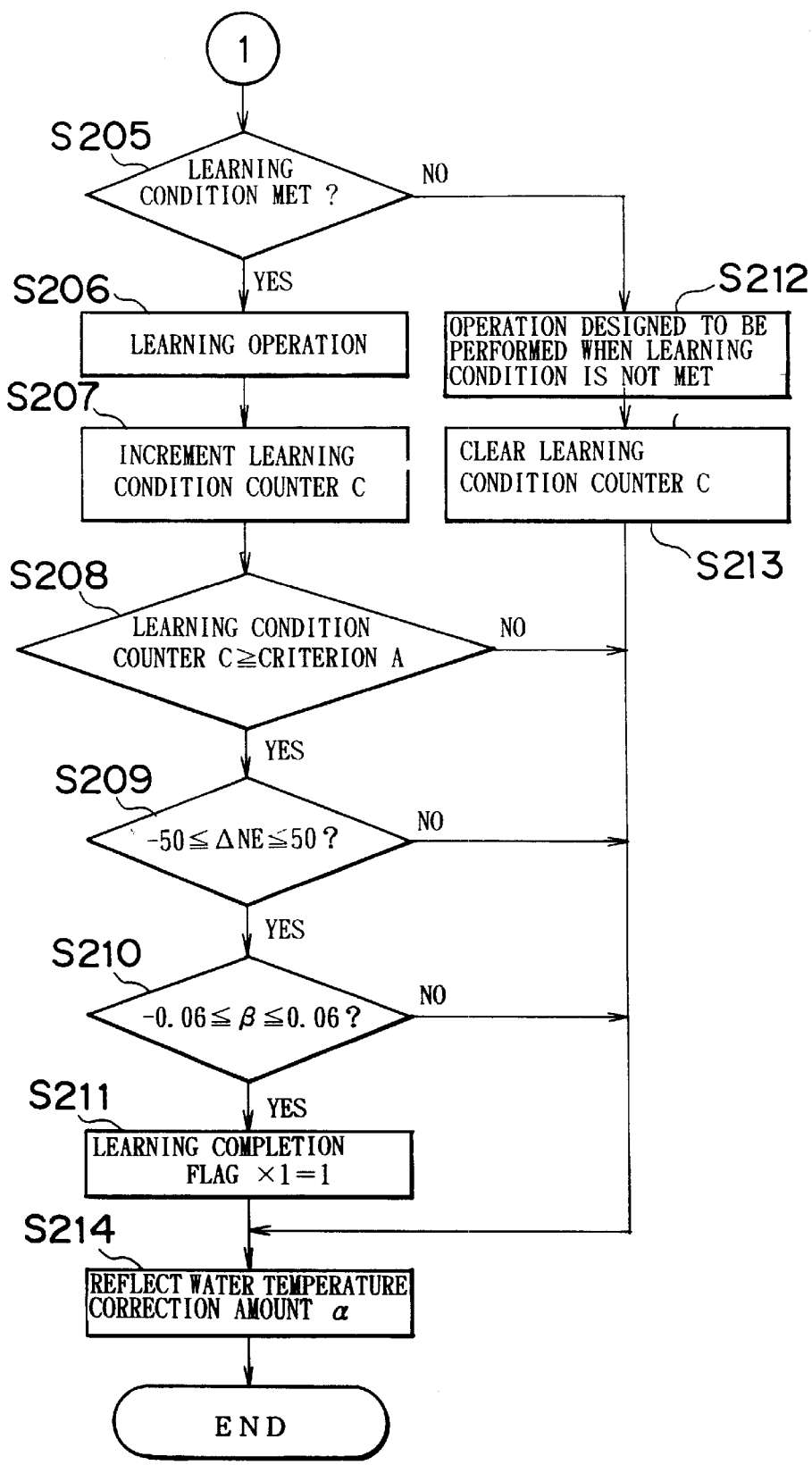

The procedures of the non-load idling and the learning control will be described with reference to FIGS. 6 through 8.

Figure 6:
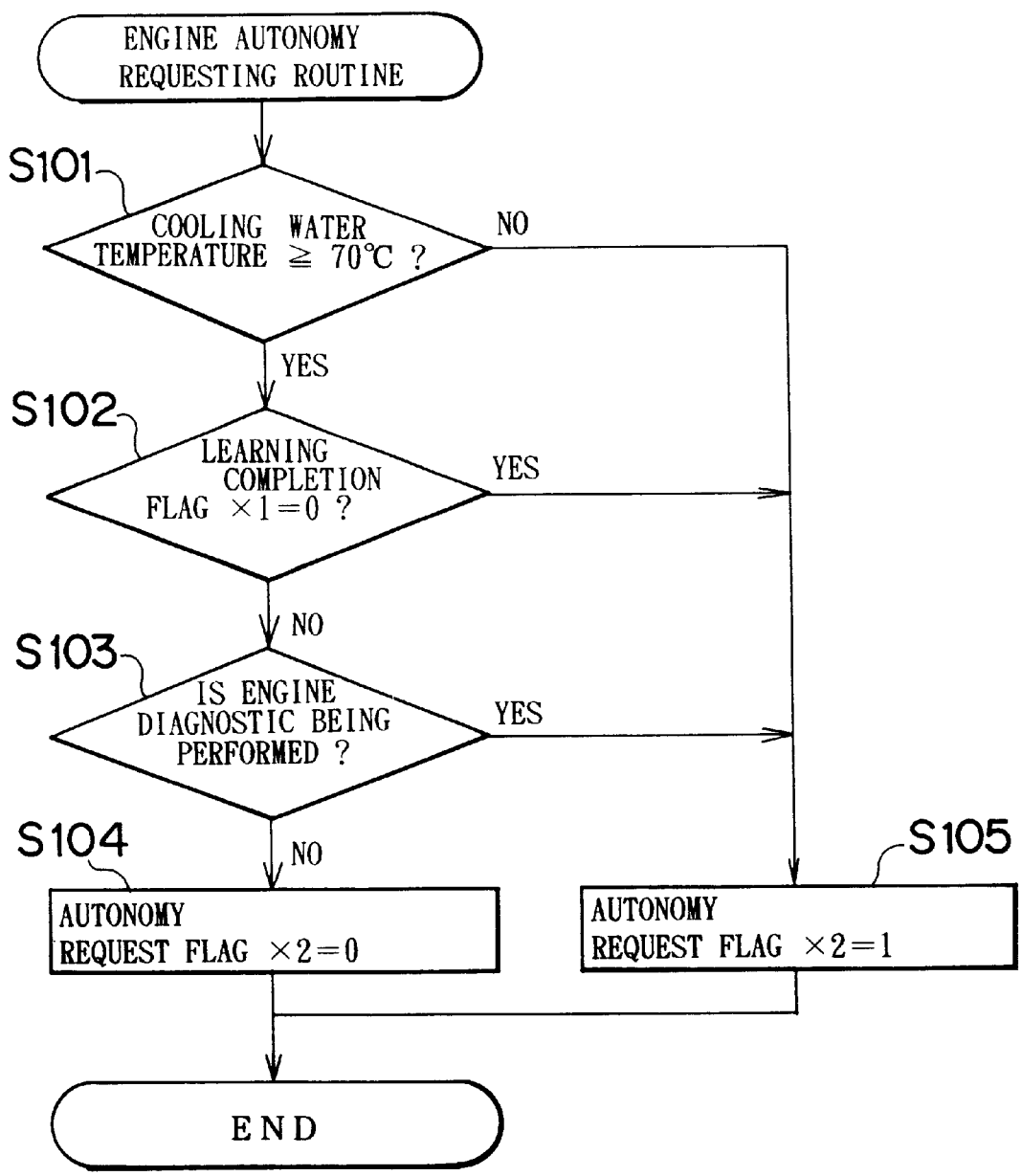
FIG. 6 is a flowchart of an engine autonomy requesting procedure.

FIG. 6 is a flowchart illustrating an engine autonomy requesting routine for requesting an autonomous operation of the engine 12. The engine autonomy requesting routine is executed by the ECU 92, for example, by the interruption at every predetermined period of time.

When this routine is started, the ECU 92 determines in step S101 whether the engine 12 has been sufficiently warmed up so that the cooling water temperature has become equal to or higher than a predetermined temperature (for example, 70° C.), on the basis of the detection signal from the water temperature sensor 25. If it is determined in step S101 that the cooling water temperature has become equal to or higher than 70° C., that is, the engine 12 has been sufficiently warmed up, operation proceeds to step S102. In step 102, the ECU 92 determines whether "0" has been set in a predetermined area in the RAM 95 defined as a learning completion flag X1. The learning completion flag X1 is used to determine whether the learning operation (described later) has been completed. The learning completion flag X1 is initially set to "0".

If it is determined in step S102 that the flag X1 is not "0", that is, if it is determined that the learning operation has been completed, operation proceeds to step 103. In step S103, the ECU 92 determines whether the diagnostic of the engine 12 is being performed. The diagnostic of the engine 12 is normally performed when the automatic transmission 15 is in the parking range and a fuel cut is not being performed, in order to diagnose the control conditions of the engine (for example, engine revolution speed and ignition timing). Therefore, if the automatic transmission 15 is not in the parking range or if the fuel cut is being performed, the ECU 92 determines that the diagnostic of the engine 12 is not being performed.

If it is determined in step S104 that the diagnostic of the engine 12 is not being performed, operation proceeds to step S104. In step S104, the ECU 92 sets "0" into a predetermined area of the RAM 95 defined as an autonomy request flag X2. Then, the ECU 92 temporarily ends the engine autonomy requesting routine. If the autonomy request flag X2 is "0", the ECU 92 stops the operation of the engine 12 through another routine.

Conversely, if a negative determination is made in step S101 or an affirmative determination is made in steps S102 and S103, the operation proceeds to step S105. In step S105, the ECU 92 sets "1" into the autonomy request flag X2. Then, the ECU 92 temporarily ends the engine autonomy requesting routine. If the autonomy request flag X2 is "1", the ECU 92 starts the engine 12 through another routine. The autonomy request flag is set to "1", for example, in the following cases:

a case where it is determined that the cooling water temperature of the engine 12 is lower than 70° C., that is, the engine 12 is not sufficiently warmed up (S101);

a case where it is determined that the learning completion flag X1 is "0", that is, the learning operation is not completed (S102); and a case where it is determined that the diagnostic of the engine 12 is being performed on the basis the condition that the automatic transmission 15 is in the parking range and the fuel cut is not being performed (S103).

A learning routine for performing the learning operation will be described with reference to FIGS. 7 and 8, which show a flowchart of the learning routine. The learning routine is executed by the ECU 92, for example, by time interruption at every predetermined period of time.

In the learning routine, the process of steps S201, S202, S203 adjusts the closed-state opening of the throttle valve 29 by establishing the non-load idling state of the engine 12 and performing feedback control for idle speed control.

In step S201, the ECU 92 determines whether a feedback condition has been established on the basis of the signals from the accelerator pedal sensor 35, the vehicle speed sensor 36, the water temperature sensor 25 and the HVECU 91. The feedback condition is established when the engine 12 has been sufficiently warmed up and the non-load idling state of the engine 12 has been established, that is, when all the following conditions are met: the amount of accelerator pedal depression is zero; the vehicle speed is equal to or less than, for example, 3 km/h; the cooling water temperature is equal to or higher than, for example, 65° C.; the required amount of power generation is zero; and the autonomy request flag X2 is "1". The non-load idling of the engine 12 can be performed because the determination that the learning has not been completed (X1=0) in step S102 is followed by the setting of the autonomy request flag X2 to "1" in step S105.

If it is determined in step S201 that the feedback condition has been met, operation proceeds to step S202, where the ECU 92 performs the feedback control of idle speed. That is, the ECU 92 adjusts the closed-state opening of the throttle valve 29 through the duty control of the voltage applied to the electromagnetic solenoid of the actuator 30 so that the actual idle speed determined on the basis of the detection signal from the revolution speed sensor 24 approaches a target revolution speed determined on the basis of the operating condition of the engine 12.

The aforementioned duty control is performed on the basis of a final duty ratio instruction value DFIN calculated by adding a feedback correction amount β to a pre-set basic duty ratio instruction value DBSE. The feedback control is performed by calculating a revolution speed difference ΔNE between the actual idle speed and the target revolution speed and increasing or reducing the feedback correction amount β in accordance with the revolution speed difference ΔNE. After the closed-state opening of the throttle valve 29 is adjusted through the feedback control of idle speed in this manner, the operation proceeds to step S204. The feedback correction amount β increased or reduced in step S203 is stored as a learned value into a predetermined area in the backup RAM 96 in step S206 (FIG. 8), which follows the determination in step S205 that a learning condition has been met.

Conversely, if it is determined in step S201 that the feedback condition is not met, operation proceeds to step S203, where the ECU 92 performs an operation designed to be performed when the feedback control has not been met. That is, the ECU 92 reads out the feedback correction amount β that has been stored as a learned value in the backup RAM 96, and calculates the final duty ratio instruction value DFIN by using the feedback correction amount β from the backup RAM 96. Subsequently, the operation proceeds to step S204.

Figure 5:
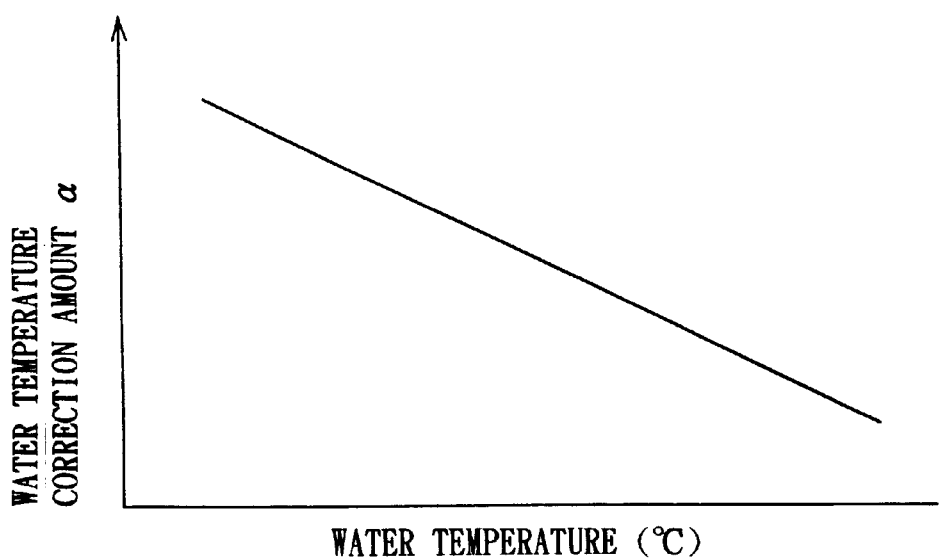
FIG. 5 is a graph of a water temperature correction amount versus water temperature.

In step S204, the ECU 92 calculates a water temperature correction amount a on the basis of the cooling water temperature of the engine 12 with reference to a map indicated in FIG. 5. As is apparent from the map, the calculated water temperature correction amount α decreases as the cooling water temperature increases. After the water temperature correction amount a is calculated, operation proceeds to step S205 (FIG. 8). The process of steps S205–S211 is executed to learn a feedback correction amount β used in the feedback control.

In step S205, the ECU 92 determines whether the learning condition has been met. The learning condition is met when the engine 12 has been warmed up and the feedback control of idle speed has been properly performed, that is, when the feedback control has been performed and the cooling water temperature is equal to or higher than, for example, 70° C., and the revolution speed difference ΔNE is within, for example, 75 rpm.

If it is determined in step S205 that the learning condition has been met, the operation proceeds to step S206. In step S206, the ECU 92 stores the feedback correction amount β used during execution of the feedback control as a learned value into the backup RAM 96. Subsequently in step S207, the ECU 92 increments a learning condition counter C by "1". The learning condition counter C is provided for measuring the elapsed time following the establishment of the learned condition. The operation then proceeds to step S208.

In step S208, the ECU 92 determines whether the value of the learning condition counter C is equal to or greater than a criterion A. The criterion A is pre-set to a value corresponding to a count value of the learning condition counter C that occurs at the elapse of, for example, 5 seconds following the establishment of the learning condition.

Therefore, if it is determined in step S208 that the count value C is equal to or greater than the criterion A, that is, C≧A, it means that 5 seconds has elapsed following the establishment of the learned condition. If it is determined that C<A, it means that 5 seconds has not elapsed following the establishment of the learning condition. The period of 5 seconds is sufficiently long for the actual idle speed to converge to the target revolution speed.

If it is determined in step S208 that the period of 5 seconds has elapsed following the establishment of the learning condition (C>A), the operation proceeds to step S209. In step S209, the ECU 92 determines whether the revolution speed difference ΔNE is within, for example, 50 rpm, that is, whether the feedback control has been properly performed. If –50 rpm≦ΔNE≦50 rpm, it is considered that the feedback control has been properly performed. Then, the operation proceeds to step S210, where the ECU 92 determines whether the feedback correction amount β used during execution of the feedback control is within a predetermined range (for example, –0.06 to 0.06).

Normally, the feedback correction amount β is likely to be greatly apart from 0 immediately after the feedback control is started. More specifically, immediately after the start of the feedback control, the actual idle speed tends to be considerably different from the target revolution speed, so that the feedback correction amount β tends to be greatly different from 0. As the feedback control progresses, the feedback correction amount β approaches 0 and stabilizes. Therefore, if the determination in step S210 is affirmative, it means that the feedback correction amount 13 stored as a leaned value in the backup RAM 96 is a proper value. The predetermined range of –0.06 to 0.06 is pre-set so that a proper feedback correction amount β is stored as a learned value. Although in this embodiment, the predetermined range is –0.06 to 0.06, the range may be appropriately changed.

It is also possible to omit one or more of steps S208–S210, in order to reduce the control load on the ECU 92.

If steps S208–S210 all make affirmative determinations, the operation proceeds to step S211. The proceeding to step S211 means that a proper feedback correction amount β has been stored as a learning value into the backup RAM 96 and that the learning of the feedback correction amount β has been completed. In step S211, the ECU 92 sets "1" into the learning completion flag X1 provided in a predetermined area of the RAM 95. Subsequently, the operation proceeds to step S214.

If the learning completion flag X1 is set to "1", the autonomy request flag X2 is set to "0" in the engine autonomy requesting routine illustrated in FIG. 6, so that the operation of the engine 12 is stopped. More specifically, the non-load idling of the engine 12 is continued until the learning of the feedback correction amount β is completed. The operation of the engine 12 is stopped after the learning is completed.

The learning completion flag X1 is reset to "0" by th ECU 92 on the basis of an off-signal from the ignition switch 38. That is, the learning (completion flag X1 is reset to "0" only when the ignition switch 38 is turned off, for example, in a case where the driving of the motor vehicle 11 ends. Therefore, once the learning of the feedback correction amount β is completed, the non-load idling of the engine 12 for the learning will not be performed, so that unnecessary continuation of the operation of the engine 12 is avoided.

If any one of steps S208–S210 makes a negative determination, the operation jumps to step S214. In this case, a proper feedback correction amount β as a learning value is not stored into the backup RAM 96, and the learning of a feedback correction amount β is not completed. Since step S211 is skipped in this case, the autonomy request flag X2 is not reset to "0" in the engine autonomy requesting routine, so that the operation of the engine 12 is continued.

In step S205, if the feedback control is not properly performed so that the revolution speed difference ΔNE is out of the range of 75 rpm, it is determined that the learning condition is not met. Then, the operation proceeds to step S212. In step S212, the ECU 92 prevents storage of the feedback correction amount β used during the execution of the feedback control, as a learned value into the backup RAM 96. Subsequently in step S213, the ECU 92 resets the learning condition counter C to "0". Subsequently, the ECU 92 proceeds to step S214, where the ECU 92 reflects the water temperature correction amount a determined in step S204 (FIG. 7) in the final duty ratio instruction value DFIN. That is, the ECU 92 determines a final duty ratio instruction value DFIN by adding the water temperature correction amount or to the sum of the basic duty ratio instruction value DBSE and the feedback correction amount β (DBSE+β). As a result, the final duty ratio instruction value DFIN is obtained as a value calculated by using an expression DBSE+α+β. After reflecting the water temperature correction amount α in the final duty ratio instruction value DFIN in this manner, the ECU 92 temporarily ends the learning routine.

The calculation α+β in the aforementioned expression serves to correct the feedback correction amount β by the water temperature correction amount α. Through this correction based on water temperature, the feedback correction amount β can be set to a value corresponding to the feedback correction amount β obtained through execution of the learning operation, even if the learning of the feedback correction amount β is not actually performed, for example, in a case where the warm-up operation of the engine 12 is being performed (water temperature is equal to or less than 70° C.), or a case where it is determined in step S205 that the learning condition is not met. Therefore, even if the closed-state opening of the throttle valve 29 is adjusted on the basis of the final duty ratio instruction value DFIN calculated by using the feedback correction amount β that is provided when the learning is not performed, the adjustment is performed properly, so that a good operating condition of the engine 12 is maintained.

Optionally, the reflection of the water temperature correction amount α in the final duty ratio instruction value DFIN to be used for adjustment of the closed-state opening of the throttle valve 29 may be omitted. In this case, steps S204 and S214 in the learning routine may be omitted.

The hybrid-type motor vehicle 11 according to this embodiment performs the feedback control through the non-load idling operation in order to adjust the idle speed closer to the target revolution speed. The feedback correction amount β used during the feedback control is stored as a learned value into the backup RAM 96. The non-load idling operation is continued until the learning is completed. By calculating a final duty ratio instruction value DFIN by using the feedback correction amount β learned in the aforementioned manner, it becomes possible to adjust the closed-state opening of the throttle valve 29 to a proper opening on the basis of the final duty ratio instruction value DFIN in the hybrid-type motor vehicle 11. Therefore, the embodiment prevents an event that the closed-state opening of the throttle valve 29 becomes significantly less than a proper opening so that the engine revolution speed becomes lower than a proper value thereby making it impossible to sufficiently charge the battery 17. The embodiment also prevents an event that the closed-state opening of the throttle valve 29 becomes significantly greater than a proper opening so that the engine revolution speed becomes higher than a proper value resulting in deterioration of the drivability of the motor vehicle 11.

Furthermore, since the feedback correction amount β is stored as a learned value into the backup RAM 96, the learned feedback correction amount β stored in the backup RAM 96 can be used as an initial value the next time the feedback control is started. By using the learned feedback correction amount β as an initial value, the next performance of the feedback control can quickly adjust the actual idle speed closer to the target revolution speed and therefore quickly adjust the closed-state opening of the throttle valve 29.

The learning of the feedback correction amount β is inhibited if the cooling water temperature is low, for example during the warm-up operation of the engine 12. In this case, the water temperature correction amount α is added to the learned feedback correction amount β, so-that the feedback correction amount β becomes a value corresponding to the feedback correction amount β obtained through the learning operation. Therefore, by controlling the closed-state opening of the throttle valve 29 on the basis of the final duty ratio instruction value DFIN calculated by using the feedback correction amount β, a good operating condition of the engine 12 can be achieved even if the opportunity of learning the feedback correction amount β is reduced.

Normally, immediately after the feedback control of idle speed is started, the actual idle speed may be significantly different from the target revolution speed and, therefore, the feedback correction amount β is likely to significantly deviate from "0". As the feedback control progresses, the feedback correction amount β approaches "0" and stabilizes. Instep S210 (FIG. 8) of the learning routine in this embodiment, the learning of the feedback correction amount β is ended on condition that the feedback correction amount β is within the predetermined range (for example, −0.06 to 0.06) where the feedback correction amount β stabilizes with reduced fluctuation. Therefore, a proper feedback correction amount β can be learned according to the embodiment.

Furthermore, in this embodiment, the learning completion flag X1 is reset to "0" on condition that the ignition switch 38 is turned off, for example, in a case where the operation of the motor vehicle 11 ends. Therefore, if the learning of the feedback correction amount D has been completed and the learning completion flag X1 has been set to "1", the non-load idling of the engine 12 is not performed for the learning of the feedback correction amount β, so that unnecessary continuation of the non-load idling operation of the engine 12 is avoided.

Although in the foregoing embodiment, the non-load idling operation for learning the feedback correction amount β is avoided if the feedback correction amount β has been learned, the invention is not limited to this control manner. That is, it is also possible according to the invention to perform the non-load idling operation for learning the feedback correction amount β even if the feedback correction amount β has been learned. This manner of control increases the opportunity to learn the feedback correction amount β, so that the learning of a proper feedback-correction amount β is further ensured.

Although in the foregoing embodiment, the cooling water temperature is reflected in the final duty ratio instruction value DFIN by the processing in step S204 (FIG. 7) and step S214 (FIG. 8), it is also possible to reflect the lubricant temperature of the engine 12 instead. This modification also achieves substantially the same advantages as achieved by the foregoing embodiment.

Although the foregoing embodiment is described in conjunction with the idle speed control that is performed by adjusting the closed-state opening, of the throttle valve 29, the invention is not limited to such control. The invention may also be applied to idle speed control that is performed by adjusting the air flow area of a bypass passage that extends around the throttle valve 29, by using an idle speed control valve. This idle speed control adjusts the opening of the idle speed control valve, instead of adjusting the closed-state opening of the throttle valve 29.

Although the foregoing embodiment is described in conjunction with the learning of the feedback correction amount β used during the feedback control of the idle speed, the invention may also be applied to the learning operation related to other engine controls. For example, it is also possible to apply the invention to the learning control of the amount of fuel injection, the ignition timing and the amount of purge.

While the present invention has been described with reference to what is presently considered to be a preferred embodiment thereof, it is to be understood that the invention is not limited to the disclosed embodiment or construction. To the contrary, the invention is intended to cover various modifications and equivalent arrangements.

What is claimed is:

1. A control apparatus for an internal combustion engine installed in a vehicle, the control apparatus comprising:
   an engine stopper that stops the internal combustion engine in accordance with a running condition of the vehicle;
   control value learning means for learning a control value for control of the internal combustion engine during operation of the internal combustion engine; and
   stop inhibiting means for inhibiting the internal combustion engine from being stopped by the engine stopper until the learning of the control value by the control value learning means is completed.

2. A control apparatus according to claim 1, further comprising learned value correction means for correcting the control value learned by the control value learning means in accordance with the running condition of the internal combustion engine.

3. A control apparatus according to claim 2, wherein the stop inhibiting means does not inhibit the internal combustion engine from being stopped, if the control value has been learned by the control value learning means.

4. A control apparatus according to claim 1, wherein the stop inhibiting means does not inhibit the internal combustion engine from being stopped, if the control value has been learned by the control value learning means.

5. A control apparatus according to claim 1, wherein the control value learning means performs feedback control of an amount of control of the internal combustion engine.

6. A control apparatus according to claim 5, wherein the feedback control controls idle speed of the internal combustion engine.

7. A method for controlling an internal combustion engine installed in a vehicle, the method comprising the steps of:
   stopping the internal combustion engine in accordance with a running condition of the vehicle;
   learning a control value for controlling the internal combustion engine during operation of the internal combustion engine; and
   inhibiting the internal combustion engine from being stopped until the learning of the control value is completed.

8. A control method according to claim 7, further comprising the step of correcting the control value learned in the learning step in accordance with the running condition of the internal combustion engine.

9. A control method according to claim 8, wherein the learning step includes the step of performing feedback control of an amount of control of the internal combustion engine.

10. A control method according to claim 9, wherein the feedback control performing step includes control of idle speed of the internal combustion engine.

11. A control apparatus for an internal combustion engine installed in a vehicle, the control apparatus comprising:
    an engine stopper that stops the internal combustion engine in accordance with a running condition of the vehicle;
    control value learning device for learning a control value for control of the internal combustion engine during operation of the internal combustion engine; and
    stop inhibiting device for inhibiting the internal combustion engine from being stopped by the engine stopper until the learning of the control value by the control value learning means is completed.

12. A control apparatus according to claim 11, further comprising learned value correction device for correcting the control value learned by the control value learning device in accordance with the running condition of the internal combustion engine.

13. A control apparatus according to claim 12, wherein the stop inhibiting device does not inhibit the internal combustion engine from being stopped, if the control value has been learned by the control value learning device.

14. A control apparatus according to claim 11, wherein the stop inhibiting device does not inhibit the internal combustion engine from being stopped, if the control value has been learned by the control value learning device.

15. A control apparatus according to claim 11, wherein the control value learning device performs feedback control of an amount of control of the internal combustion engine.

16. A control apparatus according to claim 15, wherein the feedback control controls idle speed of the internal combustion engine.

* * * * *